Patented Mar. 29, 1949

2,465,470

UNITED STATES PATENT OFFICE 2,465,470

INSECT REPELLENT STICK

Allen L. Omohundro, Wilton, and Franz M. Neumeier, Fairfield, Conn., and Benjamin R. Zeitlin, Bronx, N. Y., assignors to McKesson & Robbins, Incorporated, Bridgeport, Conn., a corporation of Maryland No Drawing. Application January 11, 1947, Serial No. 721,670

5 Claims. (Cl. 167—42)

The present invention relates to an insect repellent stick and to its method of manufacture.

One object of the present invention is to provide an insect repellent stick which is transparent, stable at extremes of temperature normally encountered, non-fragile and non-bleeding, and which can be easily applied to the skin area.

Another object is to provide a process of manufacturing an insect repellent stick having the characteristics above referred to.

Certain liquids suitable as protection against insects or as insect repellents, and having certain physical and chemical characteristics, have, so far, been used in lotions and creams. It has been found that the repellent action of these liquids could be increased and prolonged by combining them with an alcohol. In accordance with the present invention, these liquid insect repellents are incorporated as an active ingredient in a solid alcoholic gel, and in a manner to form a stick having the desirable properties above referred to.

Ordinarily, solid alcoholic gels contain a very high percentage of alcohol amounting up to 95%, together with a small amount of soap, such as sodium stearate. This type of soap gel evaporates very easily when exposed to warm temperatures and when exposed to the atmosphere. Furthermore, it bleeds readily, it is fragile, and it tends to exude liquid on slight pressure. Moreover, the high concentration of alcohol required in such an alcoholic gel, would render said gel unsuitable as a carrier for the active insect repellent, because of the corresponding low concentration of this active ingredient.

In an ordinary alcoholic gel, the ingredients are miscible. The incorporation of a water insoluble ingredient in this gel would ordinarily tend to render said gel cloudy, especially at comparatively high concentrations. In accordance with certain features of the present invention, even though the insect repellent employed is water insoluble, and at comparatively high concentrations, a transparent alcoholic gel is formed therewith without any increase in the ordinary amount of soap.

The insect repellents employed to form a solid transparent alcoholic gel of the type envisioned by the present invention, are liquids at room temperature; they have a boiling point above that of the alcohol used in the gel; and they are soluble in this alcohol and insoluble in water; and the soap used for gelation is not soluble in said repellents. o-Dimethyl phthalate and 2-ethyl-1,3-hexanediol have these characteristics, and have proved to be very reliable in repelling insects, such as mosquitoes, fleas of all types, including the sand fleas, stable flies, chiggers, black flies and gnats. Other insect repellents which have the characteristics above referred to, and which may be employed in accordance with certain features of the present invention, comprise dimethyl carbobutoxy hydropyrone, prepared by condensing butyl oxalate with mesityl oxide, phenyl cyclohexanol and tetrahydro-beta-naphthol.

The combination of dimethyl phthalate and 2-ethyl-1,3 hexanediol has been found to possess a synergistic relationship, and therefore to be especially effective. However, as far as certain aspects of the invention are concerned, either one alone of these compounds may be employed as the active ingredient.

In accordance with certain features of the present invention, the active insect repellent ingredient may range from 20% to 50% at the expense of the amount of alcohol used. A gel containing, for example, about 30% of dimethyl phthalate or of 2-ethyl-1,3 hexanediol or of the combination of both, has been found to be absolutely satisfactory as a repellent.

The alcohol may be of the aliphatic type, which is usually employed to form alcoholic gels. For example, ethyl, isopropyl, n-butyl, n-amyl, hexyl and heptyl alcohol, or ethyl alcohol denatured according to some United States Government formula approved for topical use, may be employed for the purpose. Furthermore, aromatic alcohols, such as benzyl alcohol, may be used.

The amount of alcohol used in the gel of the present invention is comparatively low, but still high enough to afford a synergistic effect on the active insect repellent ingredient. The gel, in accordance with certain aspects of the present invention, can be made to contain as low as 9% absolute alcohol.

The soap used in forming the gelation desirably is substantially pure sodium stearate. Instead of sodium stearate, equivalent parts of stearic acid and sodium hydroxide may be dissolved in the alcohol employed, and can be combined to produce the same product. In such a case, the amount of water formed during the saponification process should be taken into consideration with respect to the final concentration of water in the final product.

It is desirable that the soap be of the sodium type and not of the potassium type, and that the fatty acid be of such a nature as to produce a gel having a high melting point. This can be accomplished by using a fatty acid having a high saponification number, such as stearic acid.

The amount of water in the gel is a factor which determines the transparency of the final product. A desirable content of added water has been found to be between 3 and 4%. As the concentration of water is decreased below the lower limit, the gel becomes less transparent. As the concentration of water is increased above the upper limit, the plasticity of the gel increases above the desired level, and if the added water is excessive, as for example, above 10%, the product will solidify with difficulty, or will not solidify at all.

It has been found that the temperature maintained during the manufacturing process has a definite influence on the appearance of the final product. The desirable temperature range employed during the manufacturing process is 81–82° C. If a lower temperature is employed during manufacture, the solids will only partly go into solution, thus causing a corresponding loss in transparency. Heating above that temperature tends to drive off the alcohol, thus causing again loss in transparency and stability.

A plasticizer is desirably used to prevent the stick from becoming brittle. A suitable ingredient for that purpose is glycerin.

The solid alcohol gel can be scented and/or colored with any perfume oil and/or dye which is stable at a pH of 7–9.

The following examples illustrate a number of ways in which the principle of the invention may be employed, but are not to be construed as limiting the invention:

Example I 12.2 parts by weight of o-dimethyl phthalate and 18 parts of 2-ethyl-1,3 hexanediol are mixed with 31.5 parts of isopropyl alcohol (91%). To this mixture are added 20.3 parts of sodium stearate powder, 12.1 parts of glycerin, 3.5 parts of distilled water and 1.2 parts of a color solution, the solvent of which is dimethyl phthalate. The mixture is heated at 81–82° C. and stirred from time to time. When a clear solution is obtained (usually after 7–10 minutes), the mixture is immediately removed from the source of heat and allowed to cool down to 60° C. The perfume mixture (1.2 parts) is added, and the product is poured into a suitable mold, allowed to cool to room temperature, and then removed.

Example II

The following formulation may be employed and processed as in Example I, but containing only a single active insect repellent ingredient:

| | Per cent w./w. |
|---|---|
| o-Dimethyl phthalate | 30.2 |
| Isopropyl alcohol (91%) | 31.5 |
| Sodium stearate powder | 20.3 |
| Water | 3.5 |
| Glycerin | 12.1 |
| Color | 1.2 |
| Perfume | 1.2 |

Example III

The following further formulation may be employed and processed as in Example I, but containing only a single active insect repellent ingredient:

| | Per cent w./w. |
|---|---|
| 2-ethyl-1,3 hexanediol | 30.2 |
| Isopropyl alcohol (91%) | 31.5 |
| Sodium stearate powder | 20.3 |
| Water | 3.5 |
| Glycerin | 12.1 |
| Color | 1.2 |
| Perfume | 1.2 |

As a result of the present invention, there has been incorporated the active insect repellent in an unusually high concentration in a mixture of soap, small amount of alcohol, glycerin and water, yielding a solid gel which is transparent except for the coloring, stable at extremes of temperature normally encountered, non-fragile, non-bleeding, and non-wilting, and which can be easily applied to the desired skin area. The active insect repellent ingredients do not evaporate from the gel, and actually enhance its stability. The alcohol acts not only as a vehicle in producing a solid gel, but also as a synergist.

The solid form in which the active insect repellent ingredient is presented is highly advantageous. Although dimethyl phthalate in ordinary liquid form dissolves plastics, such as nylon, rayon, nail polish, etc., in the form of a solid gel, it can be judiciously and safely applied to any desired exposed area of the body, excluding, of course, mucous membranes and body cavities. Since the product of the present invention is a solid soap gel, it can be easily washed off when desired. Being practically odorless in itself, the product can be perfumed with any of the scents ordinarily used in cosmetics.

While the invention has been described with particular reference to specific embodiments, it is to be understood that it is not to be limited thereto, but is to be construed broadly and restricted solely by the scope of the appended claims.

What is claimed is:

1. An insect repelling solid alcoholic soap gel stick containing for its active ingredient from 20% to 50% by weight of o-dimethyl phthalate and 2-ethyl-1,3 hexanediol, the proportion of each of said substances within the percentage range of the active ingredient varying from zero to 100%, alcohol in an amount from 9% to about 30%, the alcohol serving as a solvent for the active ingredient, soap in an amount to solidify the composition, and water in an amount of about 3% to 4%.

2. An insect repelling stick containing for its active ingredient from 20% to 50% by weight of o-dimethyl phthalate, 2-ethyl-1,3 hexanediol, dimethyl carbobutoxy hydropyrone, phenyl cyclohexanol, and tetrahydro-beta-naphthol, the proportion of each of said substances within the percentage range of the active ingredient varying from zero to 100%, alcohol in an amount from 9% to about 30%, the alcohol serving as a solvent for the active ingredient, soap in an amount to solidify the composition and a relatively small amount of water to produce a transparent stick.

3. A stable, transparent non-fragile and non-bleeding alcoholic soap gel stick free from wax and containing for its active ingredient by weight about 30% of o-dimethyl phthalate and 2-ethyl-1,3 hexanediol, the proportion of each of said substances within the percentage range of the active ingredient varying from zero to 100%, about 30% of approximately 91% alcohol, about 20% of sodium stearate, from 3 to 4% of added water aside from that contained in the alcohol and about 12% of glycerine.

4. A stable, transparent, non-fragile and non-bleeding alcoholic soap gel stick containing by weight about 30% o-dimethyl phthalate, about 30% of approximately 91% alcohol, about 20% of sodium stearate, from 3 to 4% of added water aside from that contained in the alcohol and about 12% of glycerine.

5. A stable, transparent, non-fragile and non-bleeding alcoholic soap gel stick containing by weight about 30% 2-ethyl-1,3 hexanediol, about 30% of approximately 91% alcohol, about 20% of sodium stearate, from 3 to 4% of added water aside from that contained in the alcohol and about 12% of glycerine.

ALLEN L. OMOHUNDRO.
FRANZ M. NEUMEIER.
BENJAMIN R. ZEITLIN.

REFERENCES CITED

The following references are of record in the file of this patent:

UNITED STATES PATENTS

| Number | Name | Date |
|---|---|---|
| 2,001,046 | Welch | May 14, 1935 |
| 2,054,989 | Moore | Sept. 22, 1936 |
| 2,079,166 | Grote | May 4, 1937 |
| 2,356,801 | Travis | Aug. 29, 1944 |
| 2,404,698 | Dreyling | July 23, 1946 |